United States Patent
Hariram (10) Patent No.: US 10,052,508 B2
(45) Date of Patent: Aug. 21, 2018

(54) CONTAINERS FOR FIRE CONTAINMENT

(71) Applicant: The Boeing Company, Chicago, IL (US)

(72) Inventor: Sham S. Hariram, Seattle, WA (US)

(73) Assignee: The Boeing Company, Chicago, IL (US)

(*) Notice: Subject to any disclaimer, the term of this patent is extended or adjusted under 35 U.S.C. 154(b) by 529 days.

(21) Appl. No.: 14/021,542

(22) Filed: Sep. 9, 2013

(65) Prior Publication Data
US 2015/0069068 A1    Mar. 12, 2015

(51) Int. Cl.
*F17C 13/00*    (2006.01)
*A62C 3/16*    (2006.01)
*A62C 3/08*    (2006.01)

(52) U.S. Cl.
CPC . *A62C 3/16* (2013.01); *A62C 3/08* (2013.01)

(58) Field of Classification Search
CPC .. A62C 3/002; A62C 3/16; A62C 3/08; B65D 90/22; H05K 5/00
USPC ......... 220/560.01, 88.1; 109/23, 36
See application file for complete search history.

(56) References Cited

U.S. PATENT DOCUMENTS

| | | | |
|---|---|---|---|
| 4,100,860 A | 7/1978 | Gablin et al. | |
| 4,974,739 A * | 12/1990 | Gelin | B65D 90/505 220/567.1 |
| 6,349,873 B1 * | 2/2002 | Slater | B65D 90/22 220/565 |
| 8,474,386 B2 * | 7/2013 | DelloRusso, Jr. | E05G 1/024 109/26 |
| 2005/0205103 A1 * | 9/2005 | Luedecke | A24F 19/00 131/231 |
| 2007/0131684 A1 * | 6/2007 | Cirillo | F42B 39/14 220/88.1 |
| 2012/0043942 A1 | 2/2012 | Sheahan, Jr. | |
| 2012/0048852 A1 * | 3/2012 | Knote | A62C 3/00 220/88.1 |
| 2012/0145125 A1 * | 6/2012 | McAlister | F02M 51/0671 123/445 |
| 2012/0180707 A1 | 7/2012 | Dellorusso, Jr. | |
| 2013/0161331 A1 * | 6/2013 | Pherson | B65D 88/14 220/560.01 |
| 2013/0206759 A1 * | 8/2013 | Wurz | A62C 3/00 220/88.2 |

(Continued)

FOREIGN PATENT DOCUMENTS

EP    0520745 A1    12/1992
WO    98/16445 A1    4/1998

OTHER PUBLICATIONS

Mohammad Al-Zubi, Emmanuel Ayorinde, Akif Dundar and Gary Witus, Acoustic and Vibration Responses of Lexan Plate Constructions, Nov. 2012, ASME 2012 International Mechanical Engineering Congress and Exposition, vol. 8, pp. 297-301.*

(Continued)

*Primary Examiner* — Andrew T Kirsch
*Assistant Examiner* — Don M Anderson
(74) *Attorney, Agent, or Firm* — Patterson + Sheridan, LLP (57) ABSTRACT

A container includes a fire-retarding material, a substantially airtight cavity, and a reinforcement material. The substantially airtight cavity is formed by the fire-retarding material and is sized to hold at least one item. The reinforcement material is connected with the fire-retarding material.

9 Claims, 7 Drawing Sheets

(56) References Cited

U.S. PATENT DOCUMENTS

2013/0264073 A1\* 10/2013 Ling ..................... A62C 3/07
                                                    169/46
2013/0264346 A1\* 10/2013 Donahue ................ A62C 3/16
                                                   220/560.01

OTHER PUBLICATIONS

European Patent Office, Partial European Search Report, Application No. 14183929.0-1659, pp. 1-7, dated Feb. 11, 2015.

\* cited by examiner

CONTAINERS FOR FIRE CONTAINMENT

FIELD OF THE DISCLOSURE

This disclosure relates to fire-protection containers which carry an item and provide fire-protection and fire containment in case the item catches on fire within the container.

BACKGROUND

It is often necessary to transport or store items, which may catch on fire, in containers. These items may comprise electrical and electronic equipment, medical equipment, batteries, computers, tablets, mobile phones, or other types of items which may catch on fire.

A system and method is needed to provide a fire-protection container to carry or store items which may catch on fire in order to prevent a fire, contain a fire, or retard a fire should one occur.

SUMMARY

In one embodiment, a container is disclosed. The container includes a fire-retarding material, a substantially airtight cavity, and a reinforcement material. The substantially airtight cavity is formed by the fire-retarding material and is sized to hold at least one item. The reinforcement material is connected with the fire-retarding material.

In another embodiment, a container is disclosed. The container includes a fire-retarding material, a cavity, and a reinforcement material. The cavity is formed by the fire-retarding material. The reinforcement material is connected with the fire-retarding material providing strength reinforcement to the fire-retarding material. The container comprises a computer case, a tablet case, a battery case, or a mobile phone case.

In still another embodiment, a method of storing or transporting an item is disclosed. In one step, an item is disposed in a cavity of a fire-retarding material of a container. In another step, the item is stored in the container or the container is transported, while containing the item, from a first location to a second location.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
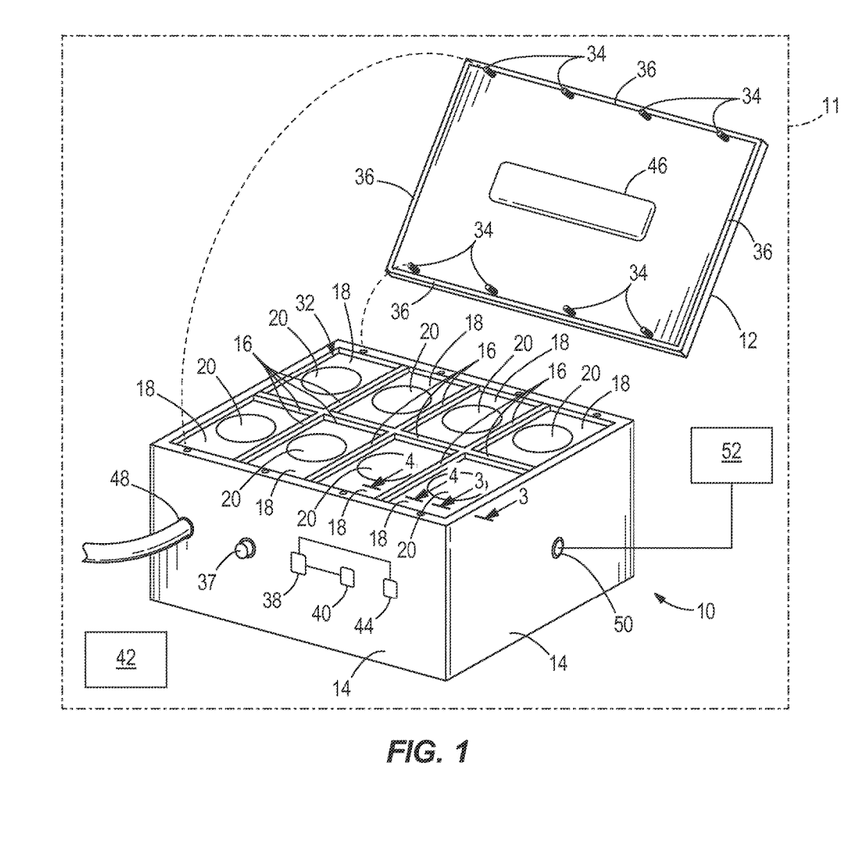
FIG. 1 illustrates a perspective view of one embodiment of a container with a removable cover of the container removed.
Figure 2:
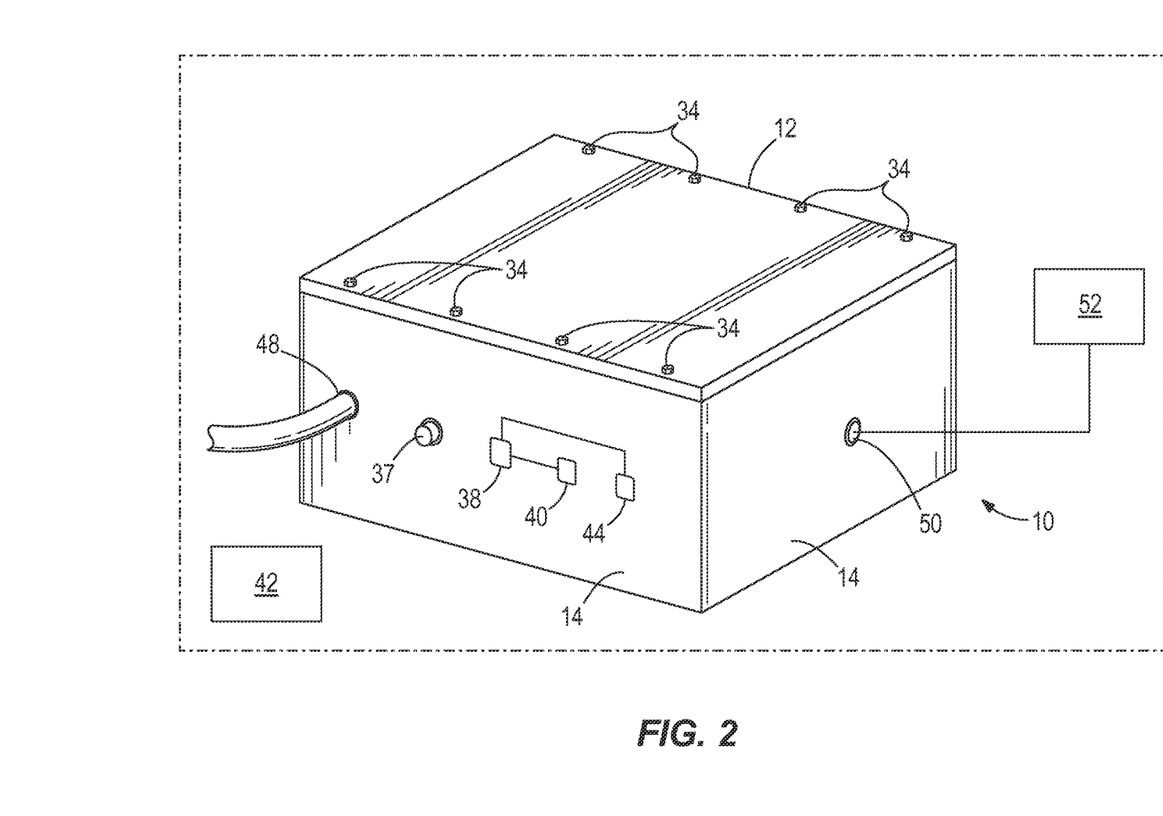
FIG. 2 illustrates the perspective view of the container of FIG. 1 with the removable cover of the container attached.

FIG. 1 illustrates a perspective view of one embodiment of a container 10 with a removable cover 12 of the container 10 removed. FIG. 2 illustrates the perspective view of the container 10 of FIG. 1 with the removable cover 12 of the container 10 attached. As shown collectively in FIGS. 1 and 2, the container 10 may be disposed within a structure 11. The structure 11 may comprise an aircraft, a train, a spacecraft, another type of vehicle, a building, or another type of structure. The container 10 comprises exterior walls 14 and interior walls 16 attached to the exterior walls 14 forming a plurality of compartments 18 within the container 10. In other embodiments, the interior walls 16 may vary in number or be missing entirely, and there may be any number of compartments 18. The plurality of compartments 18 may each hold a separate item 20. The items 20 may comprise lithium batteries, metal lithium batteries, lithium polymer batteries, lithium ion batteries, lithium phosphorus batteries, other types of batteries, or other types of items which may catch on fire. In other embodiments, the items 20 may vary in type, number, or size.

Figure 3:
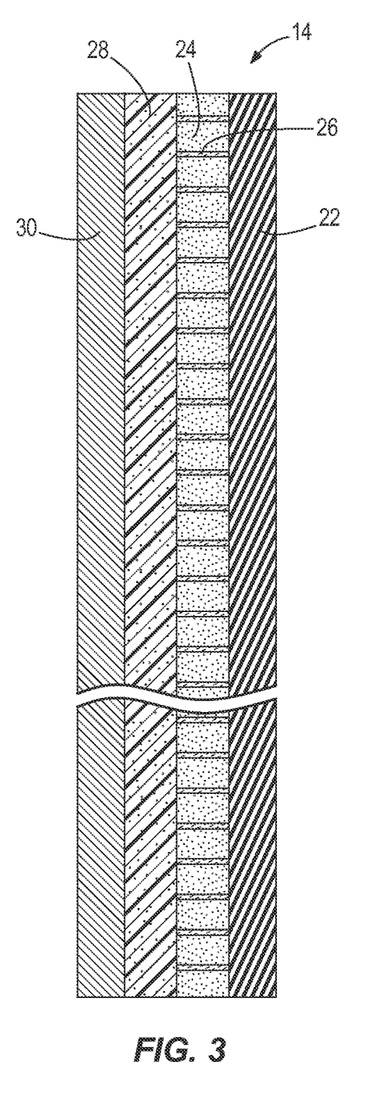
FIG. 3 illustrates one embodiment of a cross-section view through an exterior wall of the container.

FIG. 3 illustrates one embodiment of a cross-section view through one of the exterior walls 14. The exterior walls 14 may comprise a vibration isolating material 22, a fire-retarding material 24, a reinforcement material 26, a water-repelling material 28, and an exterior material 30 connected with one another. The vibration isolating material 22 may be disposed as the inner-most material within the plurality of compartments 18. The reinforcement material 26 may be interwoven with the fire-retarding material 24. The water-repelling material 28 may cover the fire-retarding material 24 and the interwoven reinforcement material 26. The exterior material 30 may be disposed on the outside of the container 10 of FIG. 1 covering the water-repelling material 28, the reinforcement material 26, the fire-retarding material 24, and the vibration isolating material 22. In other embodiments, one or more of these materials may be connected with one another in a different configuration, missing entirely, or another type of material may be added.

For purposes of this disclosure, the term 'connected with' is defined as being any of: interwoven in the same layer; disposed in the same layer; or attached in separate layers. The removable cover 12 of FIG. 1 may have the identical cross-section as the exterior walls 14 as shown in FIG. 3. In other embodiments, the removable cover 12 may have a varying cross-section with one or more of these materials connected with one another in a different configuration, missing entirely, or another type of material added.

Figure 4:
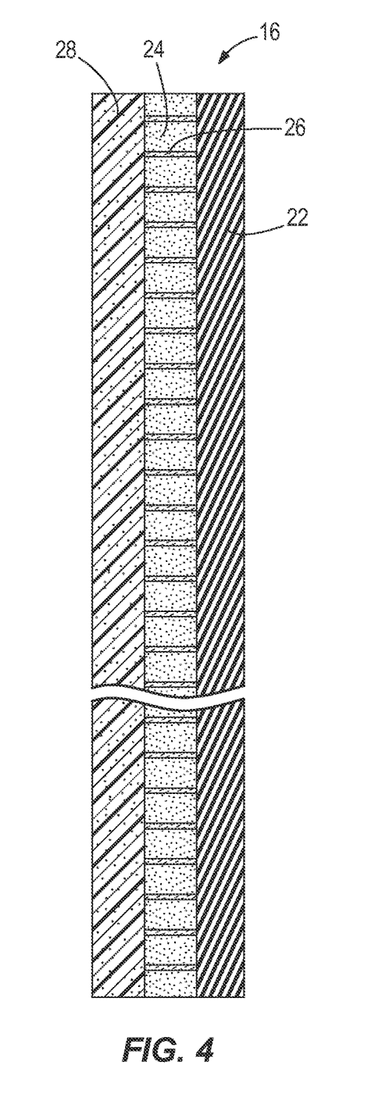
FIG. 4 illustrates one embodiment of a cross-section view through an interior wall of the container.

FIG. 4 illustrates one embodiment of a cross-section view through one of the interior walls 16. The interior walls 16 may comprise the vibration isolating material 22, the fire-retarding material 24, the reinforcement material 26, and the water-repelling material 28 connected with one another. The vibration isolating material 22 may be disposed as the inner-most material within the plurality of compartments 18. The reinforcement material 26 may be interwoven with the fire-retarding material 24. The water-repelling material 28 may cover the fire-retarding material 24 and the interwoven reinforcement material 26. In other embodiments, one or more of these materials may be connected with one another in a different configuration, missing entirely, or another type of material may be added.

The vibration isolating material 22 may comprise a closed cell, fire-resistant foam or rubber. The vibration isolating material 22 may prevent chaffing or rubbing of the items 20 disposed within the plurality of compartments 18 of FIG. 1 to reduce the occurrence of a fire. In other embodiments, the vibration isolating material 22 may comprise any type of vibration isolating material which isolates vibration of the items 20 held within the plurality of compartments 18. In one embodiment, the vibration isolating material 22 may comply with table 8.1 of RTCA DO-160E, which is hereby incorporated by reference, for the appropriate location of the container 10. Alternatively, the vibration isolating material 22 can use ISO 2685 which is also hereby incorporated by reference. In other embodiments, the vibration isolating material 22 may vary. Throughout this disclosure, any time the term "vibration isolating" is used or a reference is made to vibration isolating properties, the disclosure of this paragraph applies to the term.

The fire-retarding material 24 is made of a material which retards fire, which doesn't ignite and contains the fire, which prevents the fire from spreading, and which either suppresses the fire or extinguishes it through containment and lack of oxygen. The fire-retarding material 24 may comprise poly(4,4'-oxydiphenylene-pryomellitimide). In other embodiments, the fire-retarding material 24 may comprise any type of fire-retarding material which retards fire having fire retarding properties equivalent to Underwriter Laboratories (UL) Rating of UL-94 V-0 (does not burn) and an operating temperature range of 2450 degrees F. to 3470 degrees F. In still other embodiments, the first fire-retarding material 24 may vary further. The fire-retarding material 24 may comprise mineral wool, mineral woven material, ceramic material, ceramic paper, silicone, glass fiber, metal, intumescent paint, a coating, or another type of fire-retarding material. Throughout this disclosure, any time the term "fire-retarding" is used or a reference is made to fire-retarding properties, the disclosure of this paragraph applies to the term.

The reinforcement material 26 may comprise a ceramic, ceramic fiber, woven ceramic fabric, metal, glass fiber, ceramic wool, mineral wool, wool, or another type of reinforcement material which provides reinforcement to the fire-retarding material 24. The reinforcement material 26 may provide strength to the fire-retarding material 24 to reduce the likelihood of damage to the fire-retarding material 24. The reinforcement material 26 may provide additional strength to the material(s) being reinforced and preventing the material(s) from tearing or disintegrating. In one embodiment, the reinforcement material 26 has a fiber density of 2.2 to 2.7 gm/cm$^3$, a fiber diameter of 9 to 14 micron (Um), and a fiber tensile strength of 1.7 to 5.9 Gpa (Gigapascal) to provide strength. In other embodiments, the reinforcement material 26 may vary. Throughout this disclosure, any time the term "reinforcement" is used or a reference is made to reinforcement properties, the disclosure of this paragraph applies to the term.

The water-repelling material 28 may provide water-repelling properties to the fire-retarding material 24 to reduce the likelihood of degradation of the fire-retarding material 24 and prevent water absorption. For purposes of this disclosure, the term "water-repelling" is defined as preventing water from being absorbed by the base material. The water-repelling material 28 comprises silicone or another type of water-repelling material, coating, or spray. In one embodiment, the water-repelling material 28 has a water repellency requirement to waterproof test to ASTM D-3393 (2009). In other embodiments, the water-repelling material 28 may have varying water repellency. Throughout this disclosure, any time the term "water-repelling" is used or a reference is made to water-repelling properties, the disclosure of this paragraph applies to the term.

The exterior material 30 may comprise steel, a composite, titanium, ceramic, nickel alloy, composite, or another material able to withstand high temperatures and a harsh environment. In still other embodiments, the exterior walls 14, the interior walls 16, and the removable cover 12 may be made of varying materials in varying arrangements, may vary in number, may vary in configuration, may vary in orientation, or may vary in size.

The plurality of compartments 18 shown in FIG. 1 may be substantially airtight when the removable cover 12 is attached to the container 10 as shown in FIG. 2 covering the substantially airtight cavity 32 of the container 10 within which the plurality of compartments 18 are disposed (all of the plurality of compartments 18 may be substantially airtight forming collectively one substantially airtight cavity 32 within the batter container 10). For purposes of this disclosure, the term substantially airtight is defined as substantially preventing air or gases from going in or out of the cavity 32. In one embodiment, the term "substantially airtight" may comprise preventing 75% to 100% of air or gases from going in or out of the cavity 32. In other embodiments, the substantially airtight cavity 32 may prevent varying levels of air or gases from going in or out of the cavity 32. In one embodiment, the substantially airtight cavity 32 may be under vacuum with a pressure of $1 \times 10^{-3}$ to $1 \times 10^{-9}$ Torr or a pressure of $1 \times 10^{-9}$ to $1 \times 10^{-7}$ Pa which extinguishes a fire due to lack of air and thus lack of oxygen. In other embodiments, the substantially airtight cavity 32 may be under varying levels of vacuum to make the cavity 32 substantially airtight. Throughout this disclosure, any time the term "substantially airtight" is used or a reference is made to being airtight, the disclosure of this paragraph applies to the term.

The removable cover 12 may be attached to the container 10 with a closure member 34 to lock the removable cover 12 in place covering the substantially airtight cavity 12. The closure member 34 may comprise a plurality of fasteners, bolts, or another type of closure member for securing the removable cover 12 in place to cover the substantially airtight cavity 32. The closure member 34 may be designed to take high pressure and temperature.

The removable cover 12 may be sealed to the container 10 with a sealing member 36 to provide a substantially airtight closure. The sealing member 36 may comprise a fire-resistant gasket, silicone, or other type of fire-resistant sealing material to contain the temperatures. The container 10 may further comprise a vacuum device 37 connected to the substantially airtight cavity 32 for vacuuming air out of the cavity 32 to assist in making the cavity 32 substantially airtight. The vacuum device 37 may comprise a vacuum, a vacuum check valve with a pressure cap, or another type of vacuum device. The vacuum device 37 may also comprise a pressure relief device such as a rupture disc, a frangible disc, a relief valve, or another type of pressure relief device and may or may not be connected to a vent tube. The vacuum device 37 may further comprise a flame arrester device. In other embodiments, the pressure relief device or flame arrester may be separate from the vacuum device 37.

The container 10 may further comprise at least one sensor 38 connected to the substantially airtight cavity 32. The at least one sensor 38 comprises a pressure sensor, a temperature sensor, a smoke sensor, or a fire sensor. At least one communication device 40 is attached to the at least one sensor 38 for transmitting a signal (wireless or wired) to a remotely located receiver 42 in order to pass on information detected by the at least one sensor 38 to the remotely located receiver 42. The remotely located receiver 42 may be connected to a control instrument of the structure 11 to alert a person operating the structure 11 of the fire or to alert a system.

The container 10 may further comprise an indicator 44 disposed on an exterior of the container 10 which is adapted to indicate whether a fire has occurred in the substantially airtight cavity 32 of the container 10. The indicator 44 may comprise a visual or audio indicator which is connected to the at least one sensor 38. The container 10 may further comprise a fire-extinguishing device 46 connected to the substantially airtight cavity 32. The fire-extinguishing device 46 may be adapted to automatically activate in the event of a fire in the substantially airtight cavity 32 to extinguish the fire. The fire-extinguishing device 46 may contain the appropriate fire-extinguishing medium to put out a fire caused by the items 20 such as sodium chloride dry powder for class D fires, potassium acetate, graphite with magnesium distearate, or another type of fire-extinguishing medium.

The container 10 may further comprise an exit member 48 connected to the substantially airtight cavity 32 for exiting gas from a fire out of the substantially airtight cavity 32. The exit member 48 may comprise a tube or other member which is normally sealed but which becomes unsealed when a fire breaks out within the substantially airtight cavity 32 in order to remove the gas from the substantially airtight cavity 32. The exit member 48 may exit the gas from the substantially airtight cavity 32 to outside the structure 11. The exit member 48 may comprise a flame arrestor device to prevent flames from existing the container. In other embodiments, the flame arrestor device may be separate from the exist member 48.

The container 10 may further comprise at least one connection member 50 connecting the items 20 disposed within the substantially airtight cavity 32 to a system 52 of the structure 11 for powering the system 52. The at least one connection member 50 may comprise an electrical terminal which is wired to the system 52. The system 52 may comprise a battery charger, a back-up power system, a generator, or another type of system.

Figure 5:
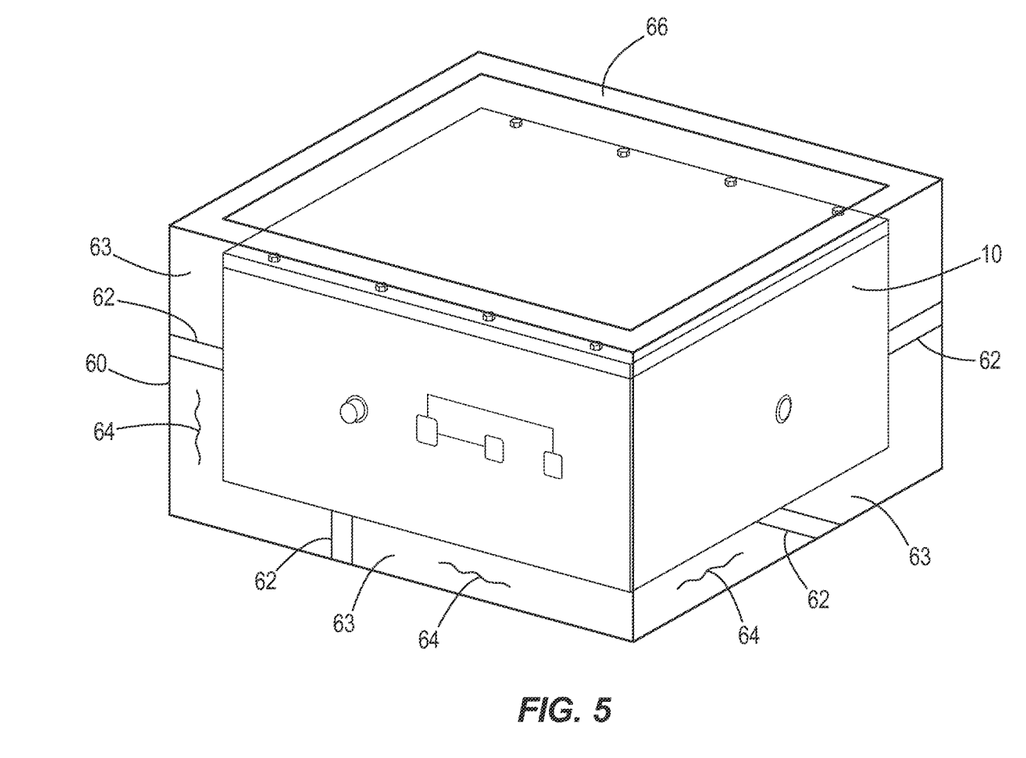
FIG. 5 illustrates a perspective view of the container of FIG. 2 disposed within a second container.

FIG. 5 illustrates a perspective view of the container 10 of FIG. 2 disposed within a second container 60. The second container 60 is made of a material which is able to withstand high temperature and a harsh environment such as steel, titanium, ceramic, nickel, alloy, composite, or another type of material. Attachment members 62 are disposed between the container 10 and the second container 60. The attachment members may comprise spacers holding the container 10 and the second container 60 a distance apart from one another leaving an annulus space 63 between them. The annulus space 63 may be empty or filled with insulating material 64 such as ceramic, wool, a honeycomb material, or another type of insulating material. A removable cover 66 may be remove-ably attached to the second container 60. The second container 60 and the annulus space 63 provide additional fire protection and fire containment in case the item in the first container 60 catches fire. In other embodiments, the container 10 may be contained within any number of additional containers to provide additional fire protection and fire containment in case the item in the first container 60 catches fire.

Figure 6:
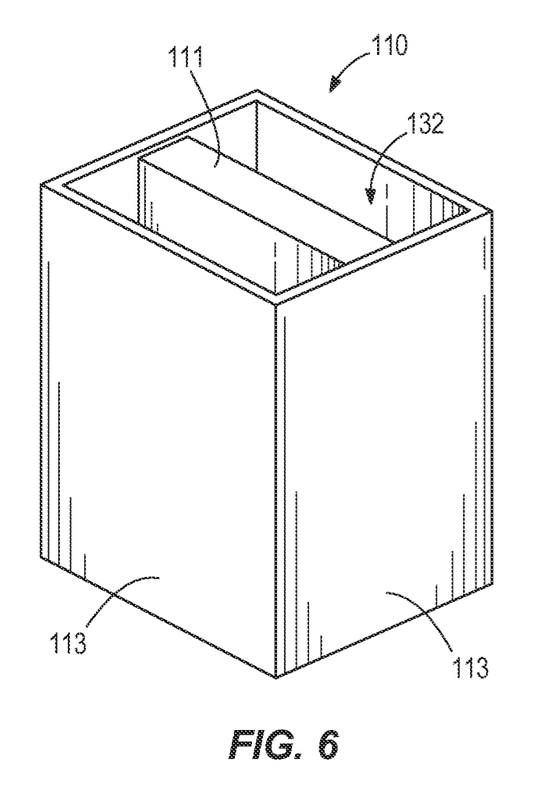
FIG. 6 illustrates a perspective view of one embodiment of a container for holding an item within a cavity of the container.

FIG. 6 illustrates a perspective view of one embodiment of a container 110 for holding an item 111 within a cavity 132 of the container 110. The container 110 may comprise a computer case, a tablet case, a battery case, or a mobile phone case. In other embodiments, the container 110 may comprise varying types of containers. The item 111 may comprise a computer, a tablet, a battery, or a mobile phone. In other embodiments, the item 111 may comprise varying types of items.

The container 110 may comprise walls 113 which comprise a vibration isolating material, a fire-retarding material, a reinforcement material, a water-repelling material, and exterior material connected with one another. The walls 113 may have the identical cross-section configuration as shown in FIG. 3. In other embodiments, these materials may have a varying configuration or orientation, one or more of these materials may be missing, or another type of material may be added.

The vibration isolating material may be attached to the fire-retarding material. The vibration isolating material may be disposed on an interior of the container 110 and may comprise a closed cell, fire-resistant foam or rubber. The vibration isolating material may prevent chaffing of the item 111 disposed within the container 110 to reduce the occurrence of a fire. In other embodiments, the vibration isolating material may comprise any type of vibration isolating material which isolates vibration of the item 111 held within the container 110.

The fire-retarding material may comprise poly(4,4'-oxy-diphenylene-pryomellitimide), mineral wool, mineral woven material, ceramic material, ceramic paper, silicone, glass fiber, metal, intumescent paint, a coating, or another type of fire-retarding material which retards fire.

The reinforcement material may be interwoven with the fire-retarding material and may comprise a ceramic, a metal, glass fiber, wool, woven ceramic fabric, ceramic wool, mineral wool, or another type of reinforcement material which provides strength reinforcement to reduce the likelihood of damage to the fire-retarding material.

The water-repelling material may cover the fire-retarding material and the interwoven reinforcement material. The water-repelling material may comprise silicone or another type of material which repels water. The water-repelling material may reduce the likelihood of degradation of the fire-retarding material.

The exterior material may be disposed on the outside of the container 110 covering the water-repelling material, the reinforcement material, the fire-retarding material, and the vibration isolating material. The exterior material may comprise steel, composite, titanium, ceramic, nickel alloy, or any type of material.

Figure 7:
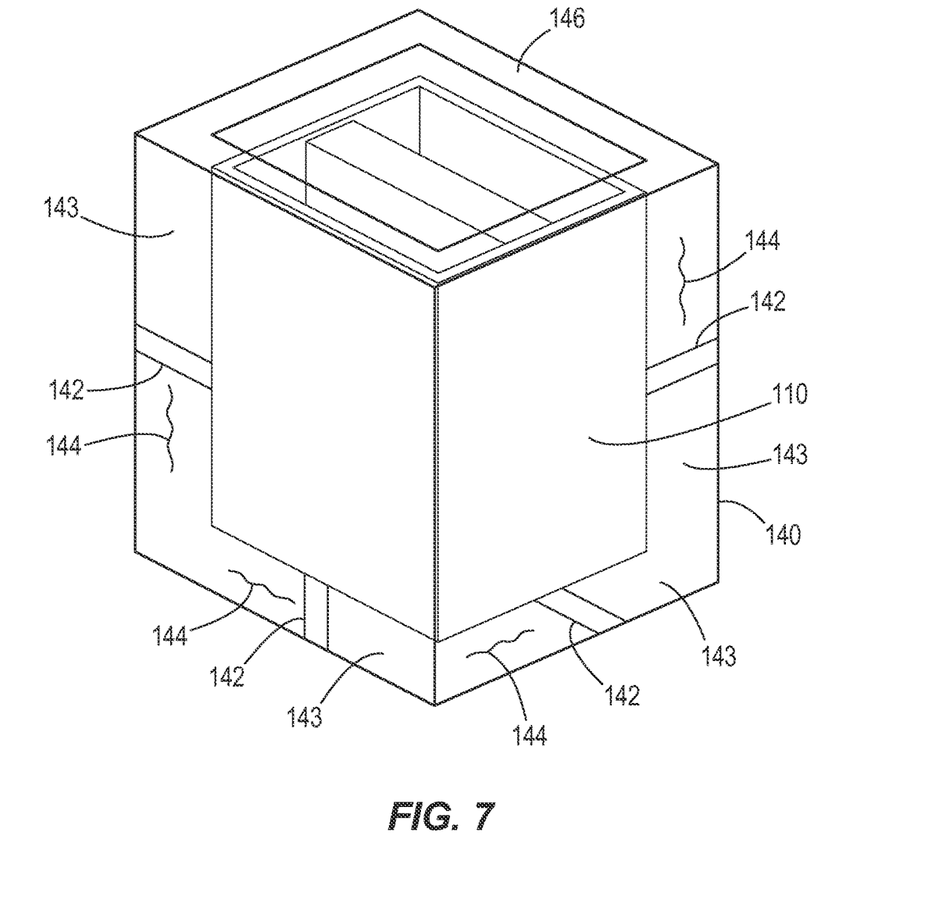
FIG. 7 illustrates a perspective view of the container of FIG. 6 disposed within a second container.

FIG. 7 illustrates a perspective view of the container 110 of FIG. 6 disposed within a second container 140. The second container 140 is made of a material which is able to withstand high temperature and a harsh environment such as steel, titanium, ceramic, nickel, alloy, composite, or another type of material. Attachment members 142 are disposed between the container 110 and the second container 140. The attachment members may comprise spacers holding the container 110 and the second container 140 a distance apart leaving an annulus space 143 between them. The annulus space 143 may be empty or filled with insulating material 144 such as ceramic, wool, a honeycomb material, or another type of insulating material. A removable cover 146 may be remove-ably attached to the second container 140. The second container 140 and the annulus space 143 provide additional fire protection and fire containment in case the item in the first container 110 catches fire. In other embodiments, the container 110 may be contained within any number of additional containers to provide additional fire protection and fire containment in case the item in the first container 110 catches fire.

Figure 8:
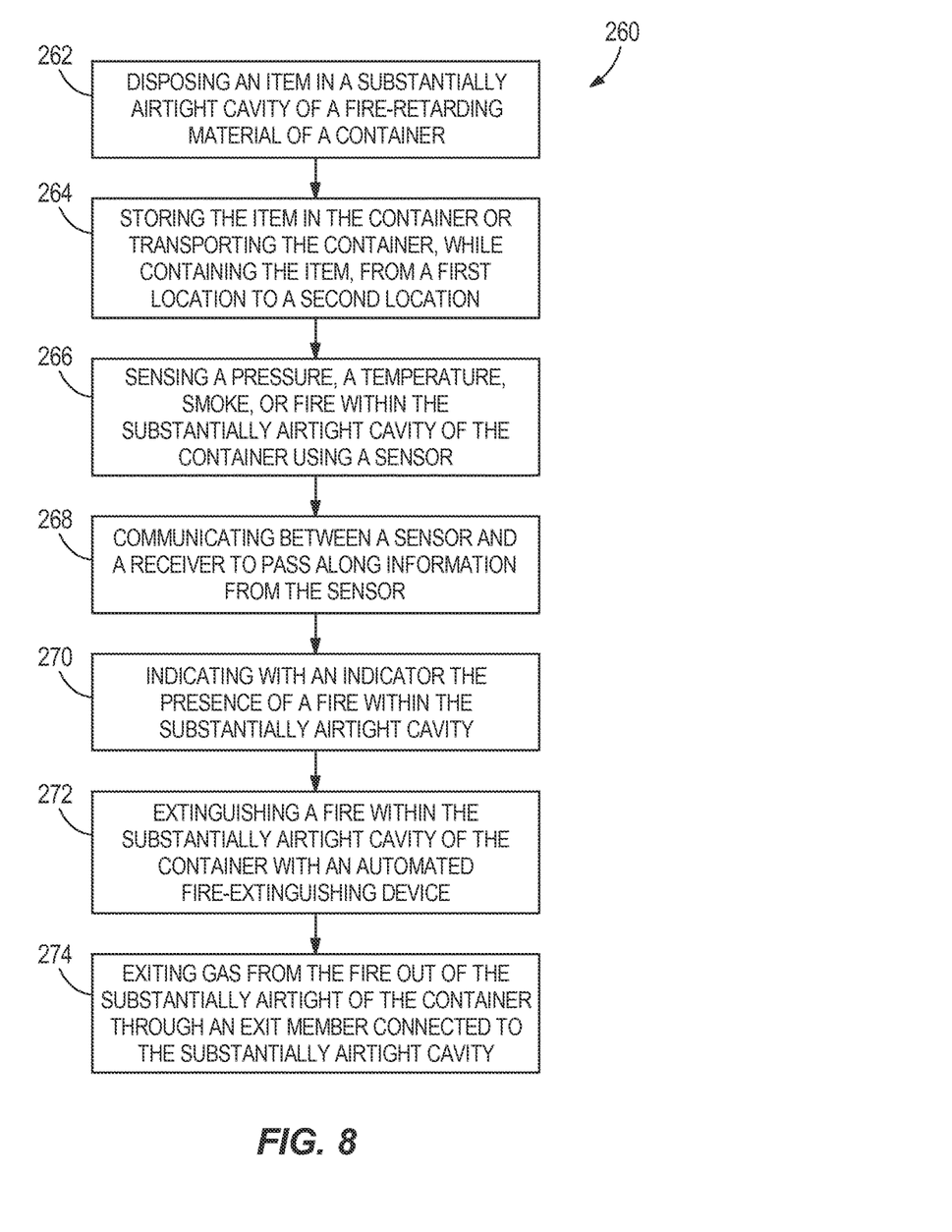
FIG. 8 is a flowchart illustrating one embodiment of a method of containing an item.

FIG. 8 is a flowchart illustrating one embodiment of a method 260 of storing or transporting an item which may start a fire, such as a battery, computer, tablet, mobile phone, or other type of item. In step 262, the item is disposed in a substantially airtight cavity of a fire-retarding material of a container. The fire-retarding material may comprise poly(4, 4'-oxydiphenylene-pryomellitimide) or another type of fire-retarding material. The fire-retarding material may be connected with a water-repelling material such as silicone, a reinforcement material such as ceramic fiber, and a vibration isolating material such as a closed cell, fire-resistant foam or rubber. In other embodiments, the fire-retarding material, the water-repelling material, the reinforcement material, and the vibration isolating material may vary. In still other embodiments, one or more of the fire-retarding material, the water-repelling material, the reinforcement material, or the vibration isolating material may be missing or another material may be present.

In step 264, the item is stored in the container or the container is transported, while containing the item, from a first location to a second location. In another embodiment, step 264 may further comprise the container being disposed in a structure such as a vehicle or another structure, and a system of the structure being powered with the item while the items is disposed in the substantially airtight cavity of the container.

In step 266, a pressure, a temperature, smoke, or fire is sensed within the substantially airtight cavity of the container using a sensor. In step 268, the sensor communicates with a receiver to pass along information from the sensor. In step 270, the presence of a fire within the substantially airtight cavity is indicated with an indicator. In step 272, a fire within the substantially airtight cavity of the container is extinguished with an automated fire-extinguishing device. In step 274, gas from the fire is exited out of the substantially airtight cavity of the container through an exit member connected to the substantially airtight cavity. In other embodiments, one or more steps of the method may be not followed, altered in order, or one or more additional steps may be added.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A container comprising:
a fire-retarding material;
a cover;
a substantially airtight cavity formed by the fire-retarding material and the cover;
an exit member in fluid communication with the substantially airtight cavity, wherein the exit member is configured to let gas out of the substantially airtight cavity in the event of a fire;
a reinforcement material connected with the fire-retarding material providing strength reinforcement to the fire-retarding material;
a water-repelling material disposed between the fire-retarding material and an external surface of the container, wherein the fire-retarding material directly contacts the water-repelling material, and wherein the reinforcement material is interwoven with the fire-retarding material such that the reinforcement material extends through the fire-retarding material and contacts the water repelling material at a first side of the fire-retarding material and an interior vibration isolating material at a second side of the fire-retarding material, wherein the first side is opposite the second side; and
at least one interior wall disposed in the cavity that divides the cavity into at least two compartments, wherein the at least one interior wall comprises the fire-retarding material and the reinforcement material.

2. The container of claim 1 wherein the water-repelling material comprises silicone.

3. The container of claim 1 wherein the reinforcement material is a ceramic fiber, a mineral, glass, or a composite fiber.

4. The container of claim 1 wherein the container is a computer case.

5. The container of claim 1 wherein the container is a tablet case.

6. The container of claim 1 wherein the container is a mobile phone case.

7. The container of claim 1 wherein the container is disposed in a second container.

8. The container of claim 7 wherein the second container is attached to the container with one or more attachment members with an annulus space disposed between the container and the second container.

9. The container of claim 8 wherein the annulus space is filled with an insulating material.

* * * * *